United States Patent
Mabuchi et al.

(10) Patent No.: US 7,411,016 B2
(45) Date of Patent: *Aug. 12, 2008

(54) RUBBER COMPOSITION AND PNEUMATIC TIRE USING THE SAME FOR TREAD

(75) Inventors: Takahiro Mabuchi, Kobe (JP); Masato Naito, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/583,159

(22) Filed: Oct. 19, 2006

(65) Prior Publication Data

US 2007/0112119 A1    May 17, 2007

Related U.S. Application Data

(63) Continuation-in-part of application No. 11/541,643, filed on Oct. 3, 2006.

(30) Foreign Application Priority Data

Nov. 14, 2005    (JP) .............................. 2005-328604

(51) Int. Cl.
*C08K 5/05*    (2006.01)

(52) U.S. Cl. ....................................... 524/391; 524/493

(58) Field of Classification Search ................. 524/493, 524/391

See application file for complete search history.

(56) References Cited

U.S. PATENT DOCUMENTS

2002/0128370 A1    9/2002  Colvin et al.

FOREIGN PATENT DOCUMENTS

| EP | 0 994 149 | 4/2000 |
| EP | 1 323 775 | 7/2003 |
| JP | 8-337687 A | 12/1996 |
| JP | 2000-119445 A | 4/2000 |
| JP | 2000-204197 A | 7/2000 |
| JP | 2002-12002 A | 1/2002 |

*Primary Examiner*—Peter D Mulcahy
(74) *Attorney, Agent, or Firm*—Birch, Stewart, Kolasch & Birch, LLP

(57) ABSTRACT

A rubber composition for a tire tread, in which wet grip performance and dry grip performance can be improved without lowering the rolling resistance property, the rubber composition including 5 to 150 parts by weight of silica having 3 to 100 of an average aspect ratio $L_1/D$ between branched particles A-A containing branched particles A on the basis of 100 parts by weight of a rubber component containing a diene rubber, the branched particle A being a particle having contact with at least 3 other particles.

9 Claims, 1 Drawing Sheet

RUBBER COMPOSITION AND PNEUMATIC TIRE USING THE SAME FOR TREAD

This application is a Continuation-In-Part of co-pending application Ser. No. 11/541,643 filed on Oct. 3, 2006, the entire contents of which are hereby incorporated by reference and for which priority is claimed under 35 U.S.C. § 120.

BACKGROUND OF THE INVENTION

The present invention relates to a rubber composition and a pneumatic tire.

In recent years, from environmental issues such as global warming, social requirements for low fuel consumption efficiency have been enhanced, and development of low fuel efficient tire in which rolling resistance is lowered has been desired in response to low fuel consumption efficiency of an automobile.

However, in general, a rubber composition lowering rolling resistance by reducing stress and hysteresis loss at low tensile elongation (at low strain) of a tire such as at low speed running decreases stress and hysteresis loss also at high tensile elongation (at high strain) of a tire such as sudden brake, and dry grip performance can not be improved. As a result, it has been difficult to have both lowering of rolling resistance and improvement in dry grip performance.

As a method of reducing rolling resistance of a tire, an technique of substituting carbon black with silica is known. However, in the rubber composition compounding silica, it is known that dry grip performance is lowered, and when repeated running, grip performance is further more lowered due to decreasing rigidity of a rubber. Also, since a silanol group which is a surface functional group of silica forms a hydrogen bond, silica tends to coagulate each other, and there is a problem such that a Mooney viscosity of a rubber composition becomes high and processability such as extrusion is inferior since dispersion of silica particles in a rubber becomes insufficient.

In order to solve theses problems, silica has been employed together with various coupling agents, a dispersing agent, a surface modifier and the like. For example, a silane coupling agent is considered to prevent silica particles from coagulating each other due to bonding with silanol groups on the surface of silica and to improve processability of the rubber composition. However, no rubber composition in which dry grip performance can be improved besides rolling resistance is lowered has been put into practical use yet.

JP-A-8-337687 discloses a rubber composition lowering rolling resistance by compounding particulate silica and a silane coupling agent, however, the rubber composition is insufficient in the improvement effects of wet grip performance and dry grip performance, and thus, it still has a scope to be improved.

SUMMARY OF THE INVENTION

An object of the present invention is to provide a rubber composition in which both wet grip performance and dry grip performance are improved, while rolling resistance is maintained, and a pneumatic tire using the same.

The present invention relates to a rubber composition comprising 5 to 150 parts by weight of silica having 3 to 100 of an average aspect ratio $L_1/D$ between branched particles A-A containing branched particles A on the basis of 100 parts by weight of a rubber component containing a diene rubber, said branched particle A being a particle with which at least 3 other particles contact.

It is preferable that the silica has an average primary particle diameter of 5 to 1,000 nm.

It is preferable that the rubber composition comprises 1 to 20 parts by weight of a silane coupling agent on the basis of 100 parts by weight of the silica.

The present invention also relates to a pneumatic tire, which comprises the rubber composition for a tread.

DETAILED DESCRIPTION

Figure 1:
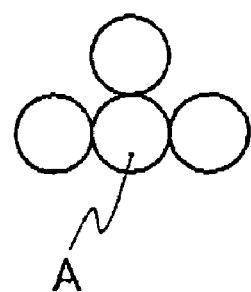
[FIG. 1] It is a schematic explanatory view of the branched particle A.

The rubber composition of the present invention comprises a rubber component and silica.

The rubber component contains a diene rubber since it can improve wet grip performance and abrasion resistance. As a diene rubber, examples are rubbers generally used in the rubber industry such as a natural rubber (NR), a styrene butadiene rubber (SBR), a butadiene rubber (BR), an isoprene rubber (IR), a butyl rubber (IIR), an acrylonitrile butadiene rubber (NBR), an ethylene propylene diene rubber (EPDM) and a chloroprene rubber (CR), these are not particularly limited, and they may be used alone or in combination of at least two kinds. Among these, from the viewpoint of having adequate strength and excellent abrasion resistance, at least one kind of rubber selected from the group consisting of NR, SBR and BR is preferable, and SBR is more preferable.

A combined styrene amount of SBR is preferably at least 20% by weight, and more preferable at least 21% by weight. When a combined styrene amount is less than 20% by weight, it tends that adequate improvement effect of grip performance can not be obtained. Also, the combined styrene amount is preferably at most 60% by weight, and more preferably at most 50% by weight. When the combined styrene amount is more than 60% by weight, a rubber becomes hard and wet grip performance tends to be lowered.

When SBR is contained in the rubber component, since an amount of SBR is preferably at least 3 parts by weight, and more preferably at least 5 parts by weight from the viewpoint that sufficient grip performance can be obtained. In particular, the amount of SBR is the most preferably 100 parts by weight.

Even though a rubber composition containing conventional particulate silica can improve wet grip performance, it can not achieve both lowering of rolling resistance and improvement of dry grip performance, however, in the present invention, both lowering of rolling resistance and improvement of dry grip performance can be achieved by that silica contained in the rubber composition is to be silica having a chain structure (hereinafter, referred to as structure silica), combining several pieces of silica. Regarding the lowering of rolling resistance at a low tensile elongation (at low strain) such as at rolling with a low slip ratio, since the structure silica is excellent in dispersibility, an occluded rubber (a rubber that is wrapped around by silica and can not be strained) which is generated by coagulation of conventional silica particles is lowered, and local stress concentration decreases. Namely, since the stress is occurred in the whole rubber matrix, the local strain becomes small and hysteresis loss is lowered on the whole, thereby, rolling resistance can be lowered. Further, regarding the improvement in dry grip performance at a high tensile elongation (at high strain) such as sudden brake and sharp curve, resistance against a rubber is generated during the time of orienting the structure silica to a direction along a tread circumference, a rubber close to the structure silica is exponentially strained, and the hysteresis loss is increased, thereby, the dry grip performance can be improved.

Figure 2:
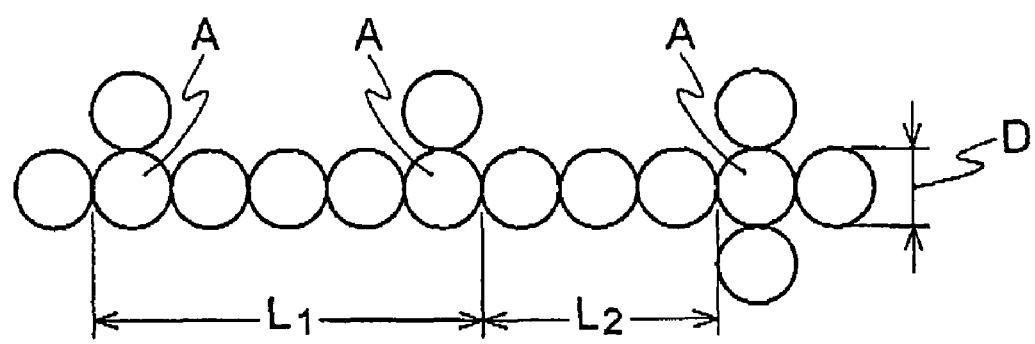
[FIG. 2] It is a schematic explanatory view of an average primary particle diameter and an average length between branched particles A-A containing the branched particles A.

Structure silica used in the present invention contains a particle with which at least 3 particles contact (hereinafter, referred to as branched particle A). The structure of particles in contact with the branched particle A is called a branched structure. The branched particle A indicates the particle A among particles shown in FIG. 1 which is a schematic explanatory view of branched particles, which is in contact with at least 3 particles. In addition, the structure silica includes silica having the branched structure (for example, in FIG. 2) and silica without having the branched structure, however since the structure silica without having the branched structure is quickly coagulated, such silica does not substantially exist.

An average primary particle diameter (D, see FIG. 2 which is a schematic explanatory view of structure silica containing branched particles) of structure silica is preferably at least 5 nm, and more preferably at least 7 nm. When D is less than 5 nm, a specific surface area is enlarged and stress shared on the interface between a rubber and silica may be increased even in a low tensile elongation area; namely, it tends that hysteresis loss is increased and rolling resistance is increased. Further, D is preferably at most 1,000 nm, and more preferably at most 800 nm. When D is more than 1,000 nm, since stress is not sufficiently increased in a high tensile elongation area and hysteresis loss is not increased, it tends that dry grip performance can not be increased.

An average length between branched particles A-A containing the branched particles A ($L_1$ in FIG. 2) of the structure silica is preferably at least 15 nm, and more preferably at least 20 nm. When $L_1$ is less than 15 nm, no effect to increase hysteresis loss due to the orientation of silica in a high tensile elongation area is obtained, and it tends that dry grip performance can not be increased. Further, $L_1$ is preferably at most 100,000 nm, and more preferably at most 80,000 nm. When $L_1$ is more than 100,000 nm, since stress is increased in a low tensile elongation area, hysteresis loss is increased, and it tends that rolling resistance is increased.

An average aspect ratio between branched particles A-A containing the branched particles A ($L_1/D$) of the structure silica is at least 3, and preferably at least 4. When $L_1/D$ is less than 3, since stress is not sufficiently increased in a high tensile elongation area and also the hysteresis loss is not increased, dry grip performance can not be improved. Further, $L_1/D$ is at most 100, and preferably at most 30. When $L_1/D$ is more than 100, since stress is increased in a low tensile elongation area, hysteresis loss is increased and rolling resistance is deteriorated.

In the present invention, D, $L_1$ and $L_1/D$ can be measured by observing silica dispersed in a vulcanized rubber composition by a transmission electron microscope. For example, $L_1/D$ is 5, when the particles are perfect sphere in FIG. 2.

As specific examples of structure silica, examples are organosilica sol IPA-ST-UP (available from Nissan Chemical Industries, Ltd.), high purity organo sol (available from Fuso Chemical Co., Ltd.), and Fine Cataloid F-120 (available from Catalysts & Chemicals Industries Co., Ltd.).

An amount of structure silica is at least 5 parts by weight, preferably at least 10 parts by weight, and more preferably at least 15 parts by weight based on 100 parts by weight of the rubber component. When an amount of structure silica is less than 5 parts by weight, adequate improvement effects of rolling resistance, wet grip performance and dry grip performance due to containing structure silica can not be obtained. Also, an amount of structure silica is at most 150 parts by weight, preferably at most 120 parts by weight, and more preferably at most 100 parts by weight. when an amount of structure silica is more than 150 parts by weight, rigidity of the rubber composition becomes high, and processability and wet grip performance are lowered.

It is preferable that a silane coupling agent is compounded together with structure silica in the rubber composition of the present invention. There is no particular limitation as the silane coupling agent, those which have been used together with silica in the tire industry may be used, and examples are bis(3-triethoxysilylpropyl)polysulfide, bis(2-triethoxysilylethyl)polysulfide, bis(3-trimethoxysilylpropyl)polysulfide, bis(2-trimethoxysilylethyl)polysulfide, bis(4-triethoxysilylbutyl)polysulfide, and bis(4-trimethoxysilylbutyl)polysulfide, and these silane coupling agents may be used alone or in combination of at least two kinds. Among these, such a silane coupling agent as bis(3-triethoxysilylpropyl)tetrasulfide is favorably used from the viewpoint of having both an effect of adding an coupling agent and cost thereof.

An amount of a silane coupling agent is preferably at least 1 part by weight, and more preferably at least 2 parts by weight based on 100 parts by weight of structure silica. When an amount of the silane coupling agent is less than 1 part by weight, since structure silica is hardly oriented to a direction along a circumference of a tread at high tensile elongation, and hysteresis loss is hardly increased, it tends that dry grip performance is lowered. Further, an amount of the silane coupling agent is preferably at most 20 parts by weight, and more preferably at most 15 parts by weight. When an amount of the silane coupling agent is more than 20 parts by weight, improvement effects due to compounding a silane coupling agent can not be obtained, and cost thereof is increased.

In addition to the above-described rubber component, structure silica, and silane coupling agent, compounding agents generally used in the rubber industry such as various softening agents, various antioxidants, stearic acid, zinc oxide, a vulcanizing agent such as sulfur, and various vulcanization accelerators can be compounded into the rubber composition of the present invention.

As for the rubber composition of the present invention, a kneaded article is obtained by kneading chemicals other than sulfur and vulcanization accelerators, for example, by a Banbury mixer (step 1). Then, sulfur and the vulcanization accelerators are added to the kneaded article and the mixture is kneaded by using, for example, a roller to obtain an unvulcanized rubber composition (step 2). Further, the rubber composition of the present invention is obtained by vulcanizing the unvulcanized rubber composition (step 3).

In the step 1, a process of mixing chemicals other than sulfur and vulcanizing accelerators in toluene which is an excellent solvent of a rubber is known, however, in the case of this process, the number of silica particles constituting structure silica becomes excessively large, and it tend that rolling resistance is increased. As a result, $L_1/D$ of structure silica becomes excessively large and rolling resistance tends to be increased.

It is preferable that the rubber composition of the present invention is used for tires, and particularly, from the viewpoints that rolling resistance can be maintained at low tensile elongation and dry grip performance can be improved at high tensile elongation at the same time as excellent in wet grip performance, the rubber composition of the present invention is preferably used for a tread among tire parts, and more preferably used for a tread for tires of such as bus and truck for heavy load, general automobile tires, and racing-car tires.

EXAMPLES

The present invention is explained in detail based on Examples, but the present invention is not limited only thereto.

Then the chemicals used in the present invention are collectively explained.

Styrene butadiene rubber (SBR): SBR1502 (combined styrene amount: 23.5% by weight) available from JSR Corporation Silica A: Organosilica sol IPA-ST-UP (chain silica sol dispersed in isopropanol, amount of silica: 15% by weight) available from Nissan Chemical Industries, Ltd.

Silica B: Ultrasil VN3 (particulate silica) available from Degussa Co. Silane coupling agent: Si69 (bis(3-triethoxysilylpropyl)tetrasulfide) available from Degussa Co.

Stearic acid: Stearic acid available from NOF Corporation

Zinc oxide: Zinc oxide No. 1 available from Mitsui Mining & Smelting Co., Ltd.

Sulfur: Sulfur powder available from Tsurumi Chemical Industry Co., Ltd.

Vulcanization accelerator TBBS: NOCCELER NS (N-tert-butyl-2-benzothiazolylsulfenamide) available from Ouchi Shinko Chemical Industrial Co., Ltd.

Vulcanization accelerator DPG: NOCCELER D (diphenylguanidine) available from Ouchi Shinko Chemical Industrial Co., Ltd.

Example 1 and Comparative Example 1

According to compounding prescriptions shown in Table 1, chemicals other than sulfur and vulcanization accelerators TBBS and DPG were kneaded under the condition at 100° C. for 5 minutes using a Banbury mixer to obtain a kneaded article. Then, sulfur and the vulcanization accelerators TBBS and DPG were added to the obtained kneaded article and the mixture was kneaded under the condition at 50° C. for 5 minutes using a roller to obtain unvulcanized rubber compositions. The obtained unvulcanized rubber compositions were press-vulcanized under the condition at 170° C. for 20 minutes to obtain vulcanized rubber compositions of Example 1 and Comparative Example 1 (preparation process 1).

Comparative Example 2

Only a rubber and silica were mixed in toluene first, not kneaded in a Banbury mixer, then, a rubber/silica masterbatch in which toluene was removed in a bath with a constant temperature at 70° C. was prepared, thereafter, a vulcanized rubber composition of Comparative Example 2 was obtained in the same manner as the preparation process 1 besides mixing a coupling agent, stearic acid and zinc oxide by using a roll (preparation process 2).

(Average Diameter, Average Length, and Aspect Ratio of Silica)

Regarding an average primary particle diameter (D), an average length (L), and an average aspect ratio (L/D) of silica, silica dispersed in vulcanized rubber compositions was observed by a transmission electron microscope, and a long diameter and a short diameter of arbitrary 30 particles were measured, and average values of these are respectively referred to as D and L, and L/D is calculated from D and L. Regarding the average length and the average aspect ratio, in order to evaluate whether the used silica has the chain structure or a coagulated structure, an average length between branched particles A-A containing the branched particles A ($L_1$), an average length between branched particles A-A without containing the branched particles A ($L_2$ in FIG. 2), an average aspect ratio between branched particles A-A containing the branched particles A ($L_1/D$) and an average aspect ratio between branched particles A-A without containing the branched particles A ($L_2/D$) were measured.

The above measured D, $L_1$, $L_2$, $L_1/D$ and $L_2/D$ of silica in the vulcanized rubber compositions for Example 1 and Comparative Examples 1 and 2 are shown in Table 1.

TABLE 1

|  | Ex. 1 | Com. Ex. 1 | Com. Ex. 2 |
|---|---|---|---|
| Kind of silica | Silica A | Silica B | Silica A |
| Preparation process of rubber composition | Preparation process 1 | Preparation process 1 | Preparation process 2 |
| Average primary particle diameter (D, nm) | 13 | 20 | 13 |
| Average length between branched particles without containing branched particle ($L_2$, nm) | 42 | 24 | 329 |
| Average length between branched particles containing branched particles ($L_1$, nm) | 55 | 24 | 430 |
| Average aspect ratio between branched particles without containing branched particle ($L_2/D$) | 3.2 | 1.2 | 25.3 |
| Average aspect ratio between branched particles containing branched particles ($L_1/D$) | 4.2 | 1.2 | 33.1 |

<Physical Properties of Vulcanized Rubber Composition>

(Rolling Resistance)

Using a viscoelasticity spectrometer VES-FIII2 manufactured by Iwamoto Seisakusho Co., Ltd., loss tangents (tan δ) of the prepared vulcanized rubber compositions were measured under the conditions of an initial strain at 10%, a dynamic strain at 2%, a frequency at 10 Hz, and a temperature at 70° C. Then, rolling resistance of respective compositions was expressed as an index calculated in accordance with the following equation, assuming rolling resistance index of Comparative Example 1 as 100. It indicates that the larger the rolling resistance index is, the more rolling resistance is lowered, and the more excellent low exothermic property is.

(Rolling resistance index)=(Tan δ of Comparative Example 1)/(Tan δ of respective compositions)×100

(Wet Grip Performance)

Rubber test pieces formed into a cylindrical shape having a length of 20 mm and a diameter of 100 mm are prepared from the prepared vulcanized rubber compositions, and using a flat belt abrasion tester (FR5010) manufactured by Ueshima Seishakusho Co., Ltd., under the conditions of a speed at 20 km/h, a load of 4 kgf, an outside air temperature at 30° C., and a water temperature at 25° C., the maximum value of friction coefficient is read, which is detected at the time when a slip ratio of a sample for a wet road surface is changed from 0 to 70%. Then, wet grip performance of Example 1 and Comparative Examples 1 and 2 are expressed as an index calculated in accordance with the following equation, assuming wet grip index of Comparative Example 1 as 100. It indicates that the larger the wet grip index is, the more excellent wet grip performance is.

(Wet grip index)=(Maximum friction coefficient of
    respective compositions)/(Maximum friction
    coefficient of Comparative Example 1)×100

(Dry Grip Performance)

Rubber test pieces formed into a cylindrical shape having a length of 20 mm and a diameter of 100 mm were prepared from the prepared vulcanized rubber compositions, and using a flat belt abrasion tester (FR5010) manufactured by Ueshima Seishakusho Co., Ltd., under the conditions of a speed at 20 km/h, a load of 4 kgf, and an outside air temperature at 30° C., the maximum value of friction coefficient is read, which is detected at the time when a slip ratio of a sample for a dry road surface is changed from 0 to 50%. Then, dry grip performance of Example 1 and Comparative Examples 1 and 2 are expressed as an index calculated in accordance with the following equation, assuming dry grip index of Comparative Example 1 as 100. It indicates that the larger the dry grip index is, the more excellent dry grip performance is.

(Dry grip index)=(Maximum friction coefficient of
    respective compositions)/(Maximum friction
    coefficient of Comparative Example 1)×100

<Properties of Pneumatic Tire>

Pneumatic tires of Example 1 and Comparative Examples 1 and 2 (tire size: 195/65R15) are prepared by forming the prepared unvulcanized rubber compositions into a tread shape, laminating with other tire parts, and vulcanizing under the condition at 170° C. for 20 minutes.

(Rolling Resistance Property)

The maximum friction coefficient generated between a contact surface and the pneumatic tire is measured by rotating the prepared pneumatic tire at a speed of 80 km/h under the conditions of a tire air pressure at 2.00 kPa, and a load of 400 kgf, using a drum testing machine, and rolling resistance property of Example 1 and Comparative Examples 1 and 2 are expressed as an index calculated in accordance with the following equation, assuming rolling resistance index of Comparative Example 1 as 100. It indicates that the larger the rolling resistance index is, the more rolling resistance is lowered.

(Rolling resistance index)=(Maximum friction coefficient of Comparative Example 1)/(Maximum
    friction coefficient of respective compositions)×
    100

(Wet Grip Performance)

The prepared pneumatic tires are mounted on a automobile for tests, actual running is carried out on a test course having a wet asphalt road surface. In this case, the automobile was run at 40 km/h, and the maximum friction coefficient (μ) during a period from the application of brake and stop is measured. Then, wet grip performance of Example 1 and Comparative Examples 1 and 2 are expressed as an index calculated in accordance with the following equation, assuming wet grip index of Comparative Example 1 as 100. It indicates that the larger the index is, the more excellent the wet grip performance is.

(Wet grip index)=(Wet grip performance of respective
    compositions)/(Wet grip performance of Comparative Example 1)×100

(Dry Grip Performance)

The prepared pneumatic tires are mounted on a automobile for tests, actual running is carried out on a test course having a dry asphalt road surface. In this case, the automobile was run at 40 km/h, and the maximum friction coefficient (μ) during a period from the application of brake and stop is measured. Then, dry grip performance of Example 1 and Comparative Examples 1 and 2 are expressed as an index calculated in accordance with the following equation, assuming dry grip index of Comparative Example 1 as 100. It indicates that the larger the index is, the more excellent the dry grip performance is.

(Dry grip index)=(Dry grip performance of respective
    compositions)/(Dry grip performance of Comparative Example 1)×100

Measurement results of the above-described tests are shown in Table 2.

TABLE 2

|  | Ex. 1 | Com. Ex. 1 | Com. Ex. 2 |
|---|---|---|---|
| Amounts (part by weight) |  |  |  |
| SBR | 100 | 100 | 100 |
| Silica A (Preparation process 1) | 50 | — | — |
| Silica B (Preparation process 1) | — | 50 | — |
| Silica A (Preparation process 2) | — | — | 50 |
| Silane coupling agent | 4 | 4 | 4 |
| Stearic acid | 2 | 2 | 2 |
| Zinc oxide | 3 | 3 | 3 |
| Sulfur | 1.5 | 1.5 | 1.5 |
| Vulcanization accelerator TBBS | 1 | 1 | 1 |
| Vulcanization accelerator DPG | 0.5 | 0.5 | 0.5 |
| Test results of rubber composition | — | — | — |
| Rolling resistance index | 100 | 100 | 95 |
| Wet grip index | 103 | 100 | 80 |
| Dry grip index | 108 | 100 | 103 |
| Test results of tire using rubber composition | — | — | — |
| Rolling resistance index | 101 | 100 | 90 |
| Wet grip index | 105 | 100 | 82 |
| Dry grip index | 110 | 100 | 105 |

Among the vulcanized rubber compositions, in Example 1 containing silica within the range of $L_1/D$ from 3 to 100, both a vulcanized rubber composition and a pneumatic tire can improve both wet grip performance and dry grip performance without increasing rolling resistance property.

Among the vulcanized rubber compositions, in Comparative Example 1 containing silica having small $L_1/D$, both a vulcanized rubber composition and a pneumatic tire can not obtain sufficient wet grip performance and dry grip performance.

Among the vulcanized rubber compositions, in Comparative Example 2 containing silica having large L/D, both a vulcanized rubber composition and a pneumatic tire can improve dry grip performance, but wet grip performance and rolling resistance property were degenerated.

According to the present invention, a rubber composition, in which wet grip performance and dry grip performance can be improved while rolling resistance is maintained by containing silica having a specific average aspect ratio between branched particles containing branched particles in the rubber composition, and a pneumatic tire using the same for a tread can be provided.

What is claimed is:

1. A rubber composition comprising 5 to 150 parts by weight of chain silica sol dispersed in isopropanol having 3 to 30 of an average aspect ratio $L_1/D$ between branched particles A-A containing branched particles A on the basis of 100 parts by weight of a rubber component containing a diene rubber, said branched particle A being a particle having contact with at least 3 other particles.

2. The rubber composition of claim 1, wherein said silica has an average primary particle diameter D of 5 to 1,000 nm.

3. The rubber composition of claim 1, comprising 1 to 20 parts by weight of a silane coupling agent on the basis of 100 parts by weight of said silica.

4. A pneumatic tire having a tread which comprises the rubber composition of claim 1.

5. A pneumatic tire containing an improved wet grip performance and an improved dry grip performance while maintaining rolling resistance which comprises the rubber composition of claim 1.

6. The rubber composition of claim 1 wherein the rubber component is styrene butadiene rubber wherein styrene is present in an amount of 20 to 60% by weight.

7. The rubber composition of claim 1 wherein the rubber component contains 3 to 100% by weight styrene.

8. The rubber composition of claim 1, wherein the average length between branched particles A-A is 15 mm to 100,00 nm.

9. The rubber composition of claim 1, wherein the amount of silica is 5 to 150 parts by weight based on 100 parts by weight of the rubber component.

* * * * *